United States Patent [19]

Miyamoto et al.

[11] Patent Number: 4,829,374
[45] Date of Patent: May 9, 1989

[54] SURFACE INSPECTION APPARATUS

[75] Inventors: Seiichi Miyamoto, Osaka; Masaru Hanatani, Nishinomiyashi; Yo Tajima, Ashiyashi, all of Japan

[73] Assignee: Kanzaki Paper Manufacturing Co., Ltd., Tokyo, Japan

[21] Appl. No.: 119,826

[22] Filed: Nov. 12, 1987

[30] Foreign Application Priority Data

Nov. 17, 1986 [JP] Japan ................. 61-273556

[51] Int. Cl.⁴ .............................................. H04N 7/18
[52] U.S. Cl. ........................................ 358/93; 358/106; 358/227
[58] Field of Search ............... 358/93, 107, 106, 227; 250/310, 311

[56] References Cited

U.S. PATENT DOCUMENTS

| | | | |
|---|---|---|---|
| 3,835,247 | 9/1974 | Soames | 358/93 X |
| 3,886,305 | 5/1975 | Yew et al. | 358/93 X |
| 3,887,764 | 6/1975 | Gibbons et al. | 358/93 |
| 4,186,301 | 1/1980 | Basire et al. | 358/93 X |
| 4,543,602 | 9/1985 | Kai et al. | 358/93 X |
| 4,713,687 | 12/1987 | Shimizu et al. | 358/93 X |

FOREIGN PATENT DOCUMENTS 28340 3/1977 Japan .

*Primary Examiner*—Howard W. Britton
*Assistant Examiner*—Victor R. Kostak
*Attorney, Agent, or Firm*—Morgan & Finnegan

[57] ABSTRACT

A surface inspection apparatus having a microscope and a television camera is disclosed. The inspection apparatus samples a signal portion from a horizontal scanning portions of the video signal produced by the television camera, compares the instantaneous voltages of a filtered signal of said sampled portion removing low-frequency components with a reference voltage, counts the number of pulses constituted from the high level portions of said filtered signal higher than said reference voltage sequentially moves the focal point of the microscope step by step relative to the object surface, compares the present pulse count with the previous pulse count thereof at just prior step of the moving of the focal point, and decides the focal point in the position corresponding to the maximum number of pulses to control the moving of the focal point for correctly setting the focal point in said corresponding position.

1 Claim, 4 Drawing Sheets

SURFACE INSPECTION APPARATUS

BACKGROUND OF THE INVENTION

1. Field of the Invention

The present invention relates to a surface inspection apparatus which employs a microscope and a television camera.

2. Prior Art

In a microscopic surface inspection apparatus, it is necessary to measure the distances between an objective lens and an object to be inspected (hereinafter referred to as "object") each time when the small visual field of a microscope are sequentially shifted in order to inspect the surface of the object in a reasonable area. That is the viewing field of a microscope which is small in accordance with the largeness of magnification of the microscope. In this case, a focus unmatching problem arises due to the fact that the focal depth of the microscope becomes smaller with the increase of magnification, as a result, a vivid focus must be hardly established to the object surface, because of uneven distances between the objective lens and the object surface by the reason that the thickness of the object is not uniform or the entire bottom surface of the object does not contact with the slide glass of the microscope.

Conventionally, automatic focusing device provided with an air micrometer system has been used to solve the above problem. In this type of a device, air is jetted through a space between an objective lens and the surface of the object so as to detect the pressure of the jetted air. Thereafter, the objective lens or the object is moved vertically so that the detected air pressure becomes the sam value with the air pressure predetermined in accordance with a predetermined distance between the object and the objective lens. This method, however, is effective only for maintaining the distance between the object surface and the objective lens to be constant. According to this method, a precise focal length must be adjusted by visually monitoring. Further, the distance between the object and the objective lens cannot be correctly measured when the object is covered with a transparent film, due to the existence of the thickness of the film.

Japanese Laid-Open Patent Publication No. 28340 of 1977 discloses a method for automatically adjusting a focal point in which a focal point is adjusted by obtaining a point where the rate of change in the magnitude of a video signal is maximum at the edge of an object of the outline of a pattern thereof. This method has also a disadvantage that a focus adjustment cannot be made in the case of a sheet-like object such as a sheet of blank paper or a piece of cloth which has no visible outline, or so wide object that its visible outline is out of the visual field of a microscope.

SUMMARY OF THE INVENTION

It is therefore an object of the present invention to provide a surface inspection apparatus capable of automatically adjusting a focal point even when the visible outline of an object to be inspected is not in the visual field of a microscope.

According to the invention, a surface inspection apparatus having a microscope for observing an object surface, and a television camera for producing a video signal of an object image observed through the microscope comprises means for sampling a signal portion from the horizontal scanning portions of the video signal at a focus position any spatial relation to the object surface, except the horizontal synchronizing signals;

means for continuously comparing the instantaneous voltages of a filtered signal in which low-frequency components have been removed from said sampled signal portion, with a reference voltage:

means for counting the pulse outputted from said voltage comparing means in response to high level portions of said filtered signal higher than said reference voltage;

pulse comparison means including means for registering the pulse count of said counting means, said pulse comparison means being capable of comparing the present pulse count by said pulse counting means with the immediate prior pulse count in said registering means;

adjustable means for sequentially varying the focal point step by step relative to the object surface to allow each of said means to execute the functions thereof in detecting each of the focal points; and means for deciding the focal point at which a maximum number of pulses has been produced among those of the steps of the focal point moving, and controlling said adjustable means to set the focal point thereof corresponding to the maximum number of pulses as a matching focal point.

The surface inspection apparatus according to the present invention is intended to detect a focal point by discovering the picture of constitution of even blank paper and cloth and innumerable fine flaws of seemingly smooth objects. More specifically, the apparatus is capable of making an automatic focus adjustment by detecting the irregularity of an object surface even if the outline thereof is out of the visual field of a microscope. Since the resolution is highest when a focal point has been matched to the object surface, the peaks in the video signal of the object are most frequent. At this time, the number of pulses in the output waveform of a voltage comparison means is maximum. According to the present invention, a focal point is set at a position corresponding to the maximum number of pulse.

BRIEF DESCRIPTION OF THE DRAWINGS

The object and feature of the present invention will become more apparent from the following description taken in conjunction with preferred embodiments thereof with reference to the accompanying drawings.

DESCRIPTION OF THE PREFERRED EMBODIMENTS

Figure 1:
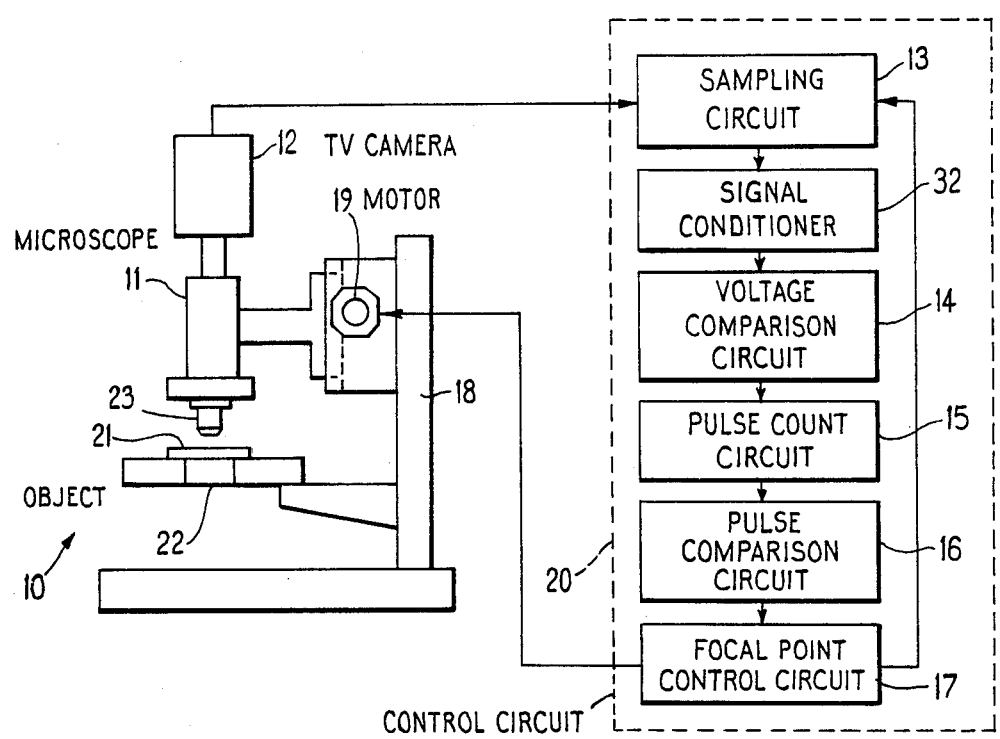
FIG. 1 is a block diagram of a preferred embodiment of the present invention.

Referring to FIG. 1 which shows an embodiment according to the present invention, a surface inspection apparatus comprises a microscope 11, a television camera 12 which produces the video signal of an object image observed through the microscope 11, a frame 18, a motor, and an XY table 22. The microscope 11 and the television camera 12 are vertically movably supported by the frame 18. The television camera 12 is mounted on the top of the lens barrel to take an object image observed through the microscope 11. The motor 19 for moving the microscope 11 with the television camera 12 vertically is secured to a frame 18 and electrically connected to be controlled by a control circuit 20. An XY table 22 supported by the frame 18 is adapted to place the object 21 thereon and change the visual field of the microscope 11 in X and Y directions with respect to the object 21 by its XY displacement.

The control circuit 20 comprises a sampling circuit 13, a signal conditioner 32, a voltage comparison circuit 14, a pulse count circuit 15, a pulse comparison circuit 16, and a focal point control circuit 17. The sampling circuit 13 is to sample from the horizontal scanning portions of the video signal of an object image, a signal portion except horizontal synchronizing signals. The signal conditioner 32 has a filtering function for cutting low-frequency components from the sampled signal portion; a voltage comparison circuit 14 for comparing the instantaneous voltages of an output signal of the signal conditioner 32 with a reference voltage. The pulse count circuit 15 is provided for counting the number of pulses in the output waveform of the voltage comparison circuit 14. The pulse comparison circuit 16 includes a parallel register 37 for registering the pulse count by the pulse count circuit 15, and is capable of comparing the number of pulses counted by the pulse count circuit 15 with a previously counted number of pulse held in the register 37. The focal point control circuit 17 is provided for successively setting focal points at the positions in spatial relation to the object surface which corresponds to a maximum number of pulses each time a visual field is displaced for the object. The output signal of the circuit 17 is applied to the motor 19, whereby the distance between the objective lens 23 and the object 21 can be correctly controlled.

Figure 2:
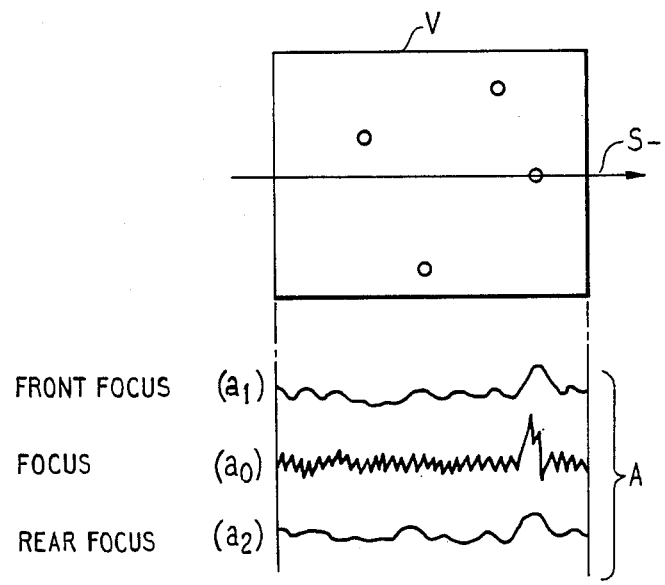
FIG. 2 shows the principle of the operation of the apparatus, according to the present invention described in the preferred embodiment.

Referring now to FIG. 2, the principle of the operation of an apparatus according to the present invention is described. The waveforms of video signals A obtained by horizontally scanning the visual field V of the microscope 11 with a horizontal scanning line S are shown in FIG. 2. The waveform ($a_1$) is obtained when the object surface is positioned in front of the focal point of the microscope 11. The waveform ($a_2$) is obtained when the object surface is just positioned at the focal point of the microscope 11. The waveform ($a_3$) is obtained when the object surface is positioned behind the focal point thereof. The resolution of the object surface is highest at the focal point, which in turn causes the number of peaks in the waveform of a video signal to increase. The apparatus according to the invention is capable of easily making an automatic focus adjustment of an object which has no visible outline within the visual field of the microscope 11 by detecting the point where the number of peaks is maximum.

Figure 3:
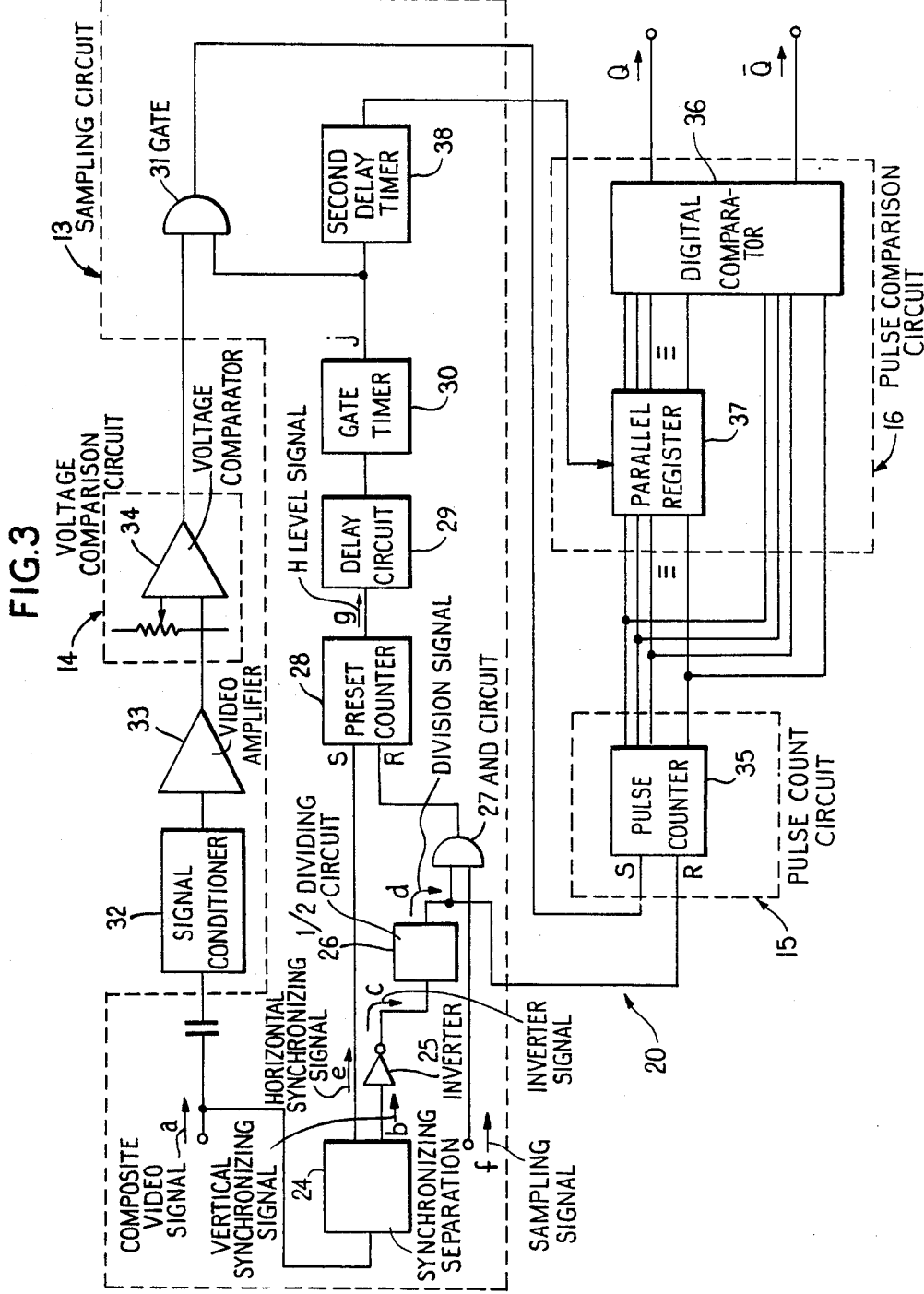
FIG. 3 is a circuit diagram of the preferred embodiment of the present invention.
Figure 4:
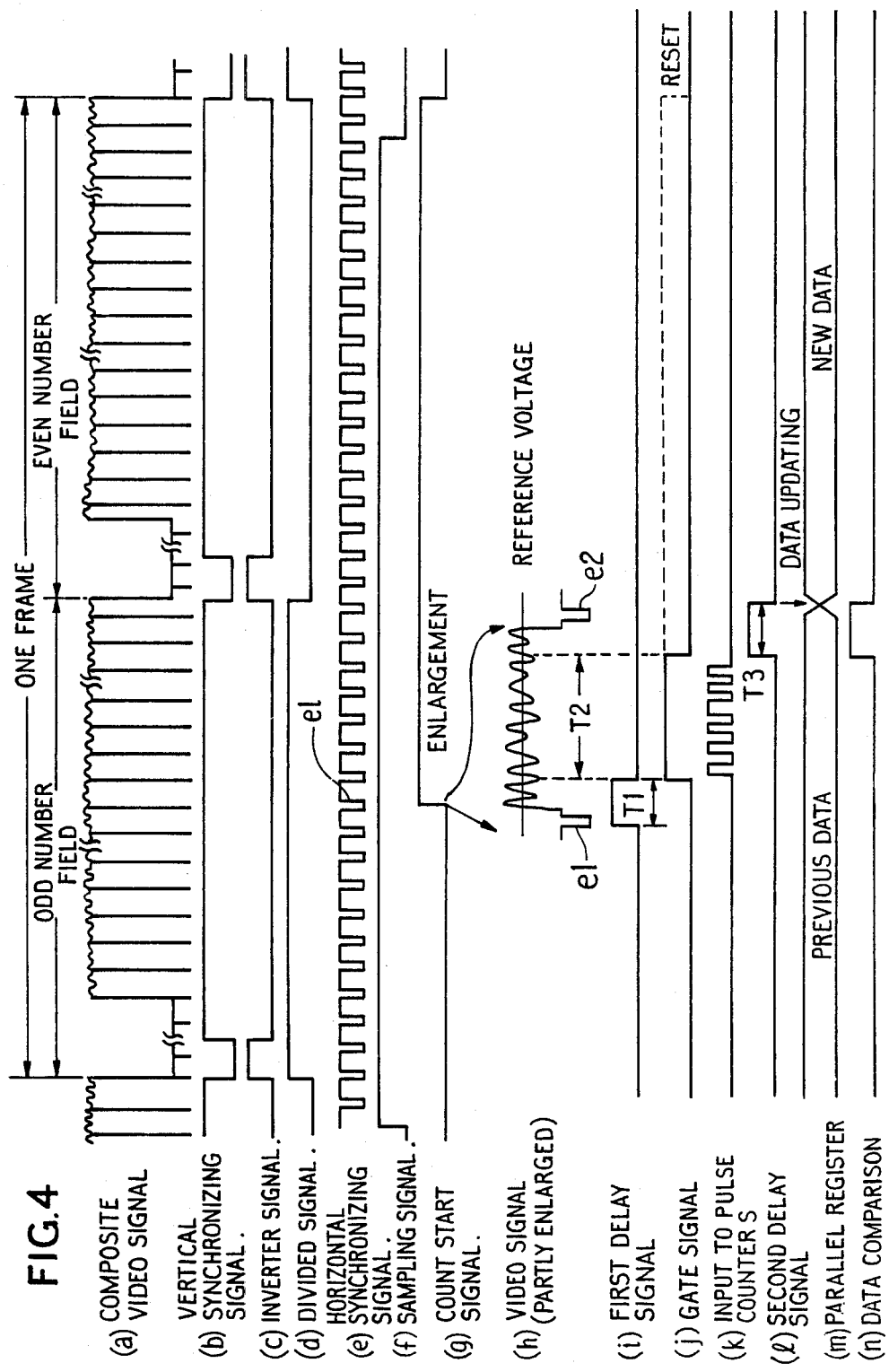
FIG. 4 shows waveforms of each of the circuit constituting elements of the preferred embodiment of the present invention.

FIG. 3 shows a block diagram of the control circuit 20 wherein each of the outputs of the circuit constituting elements has a form in timing sequence as shown in FIG. 4. In FIG. 4, reference symbol (a) denotes a composite video signal of one picture frame. The composite video signal (a) is separated into a vertical synchronizing signal (b) and a horizontal synchronizing signal (e) by a synchronizing separation circuit 24. The vertical synchronizing signal (b) is applied to an inverter 25 and a $\frac{1}{2}$ frequency dividing circuit 26. As a result, a frequency divided signal (d) for deciding whether a signal applied thereto corresponds to an odd-line field or an even-line field is obtained. The divided signal (d) is applied to one of the inputs of an AND circuit 27, with the other input thereof being supplied with a sampling signal (f) which has a comparatively long duration. A preset counter 28 is provided to be reset upon receipt of the true output of the AND circuit 27 at the reset terminal of the counter. A preset counter 28 begins the count of pulses in the horizontal synchronizing signal (e) up to a preset number, and outputs upon the count-up to the preset number an H level signal (g) synchronous with a predetermined order-horizontal synchronizing signal $e_1$. In response to the output of the preset counter 28, a first delay timer 29 starts clocking and a period $T_1$ later a gate timer 30 is operated to energize an AND gate 31 for a period of $T_2$ so that the signal not including the horizontal synchronizing signals $e_1$ and $e_2$ may pass therethrough.

Figure 5:
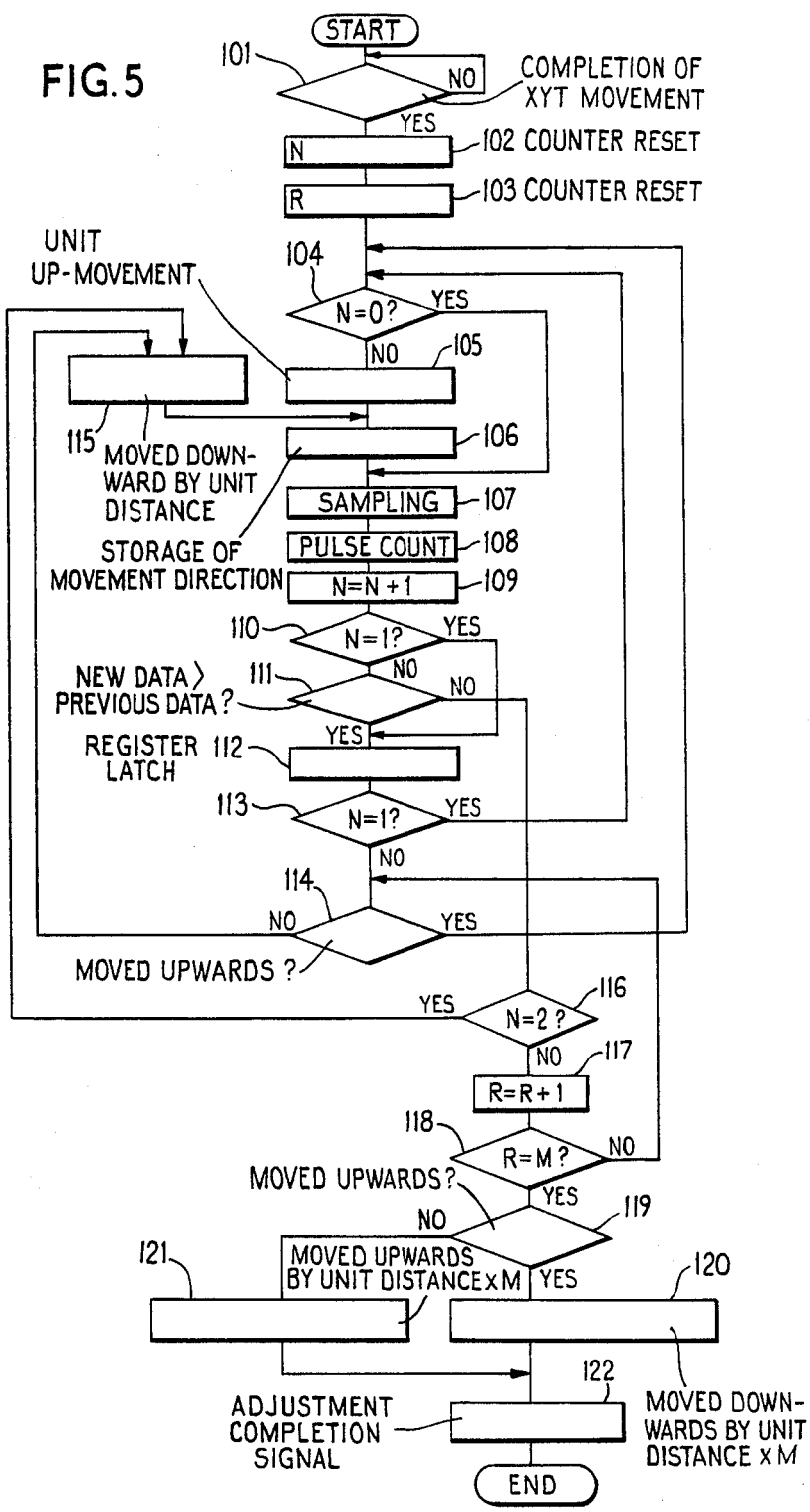
FIG. 5 is a flow chart explanatorily illustrating the operation of the preferred embodiment of the present invention.

In the period $T_2$, the video signal (a) is inputted to the signal conditioner 32 which removes unnecessary low frequency components from the video signal. Thereafter, the video signal is amplified by a video amplifier 33 having an appropriate gain, and then, inputted to a voltage comparator 34 where the instantaneous voltage of the video signal is compared with a reference voltage. The output pulse (k) of the voltage comparator 34 is gated by the gate 31, and counted by a pulse counter 35. The count output from the pulse counter 35 is supplied as a first comparison input to a digital comparator 36 where the first input count is compared with the previous count output of the pulse counter 35 stored by a parallel register 37 at the just prior step of moving the focal point of microscope 11. A second delay timer 38 allows the parallel register 37 to update the stored data for a period of $T_3$ FIG. 5 shows the operation of the automatic focus adjustment to be carried out in the focal point control circuit 17. In FIG. 5, the denotation, "N counter" is to count how many times signals are sampled. The denotation, "R counter" is to count the number of pulses, after the number of pulses decreases, while the moving of a focal point is maintained in the same direction by the automatic focal point control circuit 17 for a preset number of steps (M steps), to verify whether or not the number of pulses further decreases.

When it is detected at process 101 that the XY table has moved to a predetermined position for varying the field of view to the object, the N and R counters are reset. Since N=0 at this time, the program jumps from process 104 to 107 so as to carry out a first sampling and pulse counting. Then, the N counter is incremented from 0 to 1, so that the program jumps from process 110 to 112. At this time, the number of pulse count is not compared and the stored data is latched to the parallel register 37. Thereafter, the program jumps from 113 to 104. Since N≠0 at process 104, the program advances to processes 105 and 106. At process 105, a command is issued to move the lens barrel of microscope 11 upwards by a predetermined distance, and at process 106 the direction "upwards" is stored. Thereafter, a sampling and pulse counting are carried out. At process 109, the N counter is incremented by one, namely, N=2. At process 111, the previously latched data is compared with the newly counted data. When the newly counted data is greater the previously counted data, the latched data is updated and the program jumps from process 113 to 104, thus the same procedure being repeated. When the R counter detects that the number of pulses has started decreasing, the program branches from process 111 to 116 so as to verify whether or not the previously counted number of pulses is maximum. Then, at step 117, the R counter is incremented, namely, R=1, so that the program jumps from process 118 to 114. At process 114, it is detected that the lens barrel is to move upwards. The program jumps from process 114 to step 104. When the number of pulses is decreasing, the decision "NO" is issued at process 111. Therefore, the program which has jumped from process 118 to 114 progresses to processes 104, 105, 106, 107, 108, 109, 110, 111, 116, 117, and 118 so as to verify the data R=M. When it is detected that R is equal to M, it is decided at processes 119 and 120 that the lens barrel is moved toward the opposite direction (downwards in this case) by the predetermined step distance ×M, thus a focus adjustment being completed.

The above-described operation is carried out when the initial position of the lens barrel is below the focal point. If the initial position of the lens barrel is above the focal point, a focus adjustment operation is carried out as follows. When the number of pulse obtained by the first sampling (N=1) is compared with the number of pulse obtained by the second sampling (N=2), it is detected at process 111 that the newly counted data is smaller than the previously counted data because the newly counted data is in the lens barrel position 5. Therefore, the program is immediately branched from process 111 to process 116, and thereafter, advances from process 116 to process 115 to move the lens barrel downwards. As described above, the barrel is moved by a preset length.

As apparent from the foregoing description, a surface inspection apparatus, according to the present invention, having a microscope and a television camera, sets a focal point at a position corresponding to a maximum number of pulses by the steps of sampling, from horizontal scanning signals of a video, signal, a signal portion not including horizontal synchronizing signals, comparing the instantaneous voltage of this signal with a reference voltage, counting the number of pulses in the output of the voltage comparison circuit, and repeating these procedures while the position of the focal point is in turn varied, until it corresponds to the maximum pulse position. Thus, the apparatus is capable of making an automatic focus adjustment by detecting the unevenness of an object surface even though the edge or outline thereof is not within the visual field. Accordingly, it is unnecessary to make a focus adjustment manually when such a wide object as paper or cloth having a great area is inspected, or when the change of the visual field of a microscope is required by the fact that the magnification of the microscope is high. Thus, the apparatus of the present invention has the advantage that each time the visual field of the microscope is changed, the apparatus automatically detects the matching position of a focal point, hence simple in focus adjusting operation and accurate in detecting a focal point.

What is claimed is:

1. A surface inspection apparatus having a microscope for observing an object surface, and a television camera for producing a video signal of an object image observed through the microscope comprising:

means for sampling a signal portion from the horizontal scanning portions of the video signal at a focal point in any spatial relation to the object surface, except the horizontal synchronizing signals;

means for continuously comparing the instantaneous voltages of a filtered signal in which low-frequency components have been removed from said sampled signal portion, with a reference voltage:

means for counting the number of pulses outputted from said voltage comparing means in response to high level portions of said filtered signal higher than said reference voltage;

pulse comparison means including means for registering the pulse count of said counting means, said pulse comparison means being capable of comparing the present pulse count of said pulse counting means with the immediate prior pulse count in said registering means;

adjustable means for sequentially moving the focal point step by step relative to the object surface to allow each of said means to execute the functions thereof in detecting each of the focal points; and means for deciding the focal point at which a maximum number of pulses have been produced among those of the steps of the focal point moving, and controlling said adjustable means to set the focal point thereof corresponding to the maximum number of pulses as a matching focal point.

* * * * *